US006956975B2

(12) United States Patent
Young

(10) Patent No.: US 6,956,975 B2
(45) Date of Patent: Oct. 18, 2005

(54) METHOD FOR IMPROVING BREAST CANCER DIAGNOSIS USING MOUNTAIN-VIEW AND CONTRAST-ENHANCEMENT PRESENTATION OF MAMMOGRAPHY

(75) Inventor: Susan S. Young, Buffalo, NY (US)

(73) Assignee: Eastman Kodak Company, Rochester, NY (US)

( * ) Notice: Subject to any disclaimer, the term of this patent is extended or adjusted under 35 U.S.C. 154(b) by 561 days.

(21) Appl. No.: 09/824,602

(22) Filed: Apr. 2, 2001

(65) Prior Publication Data

US 2002/0181797 A1 Dec. 5, 2002

(51) Int. Cl.⁷ .............................. G06K 9/40; G06K 9/00
(52) U.S. Cl. ...................... 382/263; 382/266; 382/131; 382/274
(58) Field of Search ................................ 382/131, 132, 382/260, 263, 264, 266, 169, 170, 274, 275

(56) References Cited

U.S. PATENT DOCUMENTS

| | | | |
|---|---|---|---|
| 5,467,404 A | | 11/1995 | Vuylsteke et al. |
| 5,633,511 A | | 5/1997 | Lee et al. |
| 5,982,917 A | | 11/1999 | Clarke et al. |
| 6,014,474 A | | 1/2000 | Takeo et al. |
| 6,075,878 A | | 6/2000 | Yoshida et al. |
| 6,285,798 B1 | * | 9/2001 | Lee ............................. 382/260 |
| 6,611,627 B1 | * | 8/2003 | LaRossa et al. ............. 382/240 |

FOREIGN PATENT DOCUMENTS

| | | |
|---|---|---|
| EP | 0971315 A2 | 6/1999 |
| EP | 0971316 A2 | 7/1999 |
| EP | 1001370 A1 | 5/2000 |

OTHER PUBLICATIONS

Edward A. Sickles, MD, Radiology, Apr. 2000, pp. 1–16, "Breast Imaging: From 1965 to the Present".

Stephane Mallat and Sifen Zhong, IEEE Transactions on Pattern Analysis and Machine Intellifence, vol. 14, No. 7, Jul. 1992, pp. 710–732, "Characterization of Signals from Multiscale Edges".

R.N. Strickland, L.J. Gaig, W.J. Dallas, E.A. Krupinski, Digital Mammagraphy, 1996, pp. 441–446, "Wavelet–based image enhancement as an instrument for viewing CAD data".

Andrew F. Laine, Sergio Schuler, Jian Fan, Walter Huda, IEEE Transactions on Medical Imaging, vol. 13, No. 4, Dec. 1994, pp. 725–740, "Mammographic Feature Enhancement by Multiscale Analysis".

(Continued)

*Primary Examiner*—Amelia M. Au
*Assistant Examiner*—Wes Tucker
(74) *Attorney, Agent, or Firm*—Susan L. Parulski; William F. Noval

(57) ABSTRACT

A method for improving disease diagnosis using contrast enhancement presentation comprising: providing an input digital diagnostic image; applying a decomposition filter bank to the input digital diagnostic image; constructing a tone scale curve from the input digital diagnostic image; applying said tone scale curve to the input digital diagnostic image to produce a tone-scaled image; applying a decomposition filter bank to the tone-scaled image; generating the contrast weight control signals from the input digital diagnostic image by extracting the high contrast edge signals at the coarse scale; adjusting the decomposition outputs from both the input image and the tone-scaled image according to the contrast weight control signals; and applying a reconstruction filter bank to the adjusted signals to produce a contrast enhancement presentation output image.

4 Claims, 13 Drawing Sheets

OTHER PUBLICATIONS

William Mark Marrow, Raman Bhalachandra Parajape, Rangaraj M. Rangayyan, Joseph Leo Desautels, IEEE Transactions on Medical Imaging, vol. 11, No. 3, Sep. 1992, pp. 392–406, "Region–Based Contrast Enhancement of Mammograms".

Pablo G. Tahoces, Jose Correa, Miguel Souto, Carmen Gonzalez, Lorenzo Gomez, Juan J. Vidal, IEEE Transactions on Medical Imaging, vol. 10, No. 3, Sep. 1991, pp. 330–335, "Enhancement of Chest and Breast Radiographs by Automatic Spatial Filtering".

Dah–Chung Chang, Wen–Rong Wu, IEEE Transactions on Medical Imaging, vol. 17, No. 4, Aug. 1998, pp. 518–531, "Image Contrast Enhancement Based on a Histogram Transformation of Local Standard Deviation".

Patrenahalli M. Narendra, Robert C. Fitch, IEEE Transactions on Pattern Analysis and Machine Intelligence, vol. PAMI–3, No. 6, Nov. 1981, pp. 655–661, "Real–Time Adaptive Contrast Enhancement".

T.–L. Ji, M.K. Sundareshan, H. Roehrig, IEEE Transactions on Medical Imaging, vol. 13, No. 4, Dec. 1994, pp. 573–586, "Adaptive Image Contrast Enhancement Based on Human Visual Properties".

Radu Mutihac, Alberto A. Colavita, Andres Cicuttin, Alberto E. Cerdeira, pp. 329–336, "Maximum Entropy Improvement of X–Ray Digital Mammograms".

Stephen R. Aylward, Bradley M. Hemminger, Etta D. Pisano, pp. 305–312, "Mixture Modeling for Digital Mammogram Display and Analysis".

Erik L. Thurfjell, MD, K. Anders Lernevall, MD, Adam A.S. Taube, MD, Radiology, vol. 177, No. 2, pp. 241–244 & 587, "Benefit of Independent Double Reading in a Population–based Mammography Screening Program".

H. Sittek, M.F. Reiser, pp. 185–191, "Initial Clinical Experience with CAD in Mammography".

C.J. Savage, A.G. Gale, E.F. Pawley, A.R.M. Wilson, 1994 Elsevier Science, Digital Mammography, pp. 405–414, "To err is human, to compute diveine?".

Jennifer A. Harvey, Laurie L. Fajardo, Connie A. Innis, 1993 ARRS President's Award, pp. 1167–1172, AJR: 161, Dec. 1993, "Previous Mammograms in Patients with Impalable Beast Carcinoma".

H. Kundel, MD, C. Nodine, PhD, D. Carmody, MA, Investigative Radiology, May–Jun. 1978, vol. 13, No. 3, pp. 175–181, "Visual Scanning, Pattern Recognition and Decision–making in Pulmonary Nodule Detection".

Richard Bird, Terry Wallace, Bonnie Yankaskas, Radiology, Sep. 1992, Breast Imaging, pp. 613–617, vol. 614, "Analysis of Cancers Missed at Screening Mammography".

Cornelia Baines MD, Douglas McFarlane MD, Anthony Miller MB, Role of Reference Radiologist, vol. 25, No. 9, pp. 971–976, "Estimates of Inter–Observer Agreement and Potential Delay in Cancer Detection in the National Breast Screening Study".

* cited by examiner

| N | −4 | −3 | −2 | −1 | 0 | 4 | 3 | 2 | 1 |
|---|---|---|---|---|---|---|---|---|---|
| * s(n) | 0 | 0 | 1 | 4 | 6 | 4 | 1 | 0 | 0 |
| * r(n) | 0 | 0 | 0 | 1 | −1 | 0 | 0 | 0 | 0 |
| * p(n) | 0 | 0 | 1 | 4 | 6 | 4 | 1 | 0 | 0 |
| * q(n) | 0 | −1 | −9 | −37 | −93 | 93 | 37 | 9 | 1 |
| * l(n) | 1 | 8 | 28 | 56 | 326 | 56 | 28 | 8 | 1 |

FIG. 4

METHOD FOR IMPROVING BREAST CANCER DIAGNOSIS USING MOUNTAIN-VIEW AND CONTRAST-ENHANCEMENT PRESENTATION OF MAMMOGRAPHY

FIELD OF THE INVENTION

This invention relates in general to a method for presenting image details in a digital image, and more particularly to a method for presenting diagnostically important image details in digital mammography.

BACKGROUND OF THE INVENTION

Breast cancer screening using mammography has demonstrated that early detection is one obvious way to increase survival. However, due to the limitations of the observers, not all potentially detectable cancers are reported. Studies (see C. J. Baines, D. V. McFarlane, and A. B. Miller, "The role of the reference radiologist: estimates of interobserver agreement and potential delay in cancer detection in the national cancer screening study," Invest Radiology, 25, pp. 971–976, 1990; R. E. Bird, T. W. Wallace, and B. C. Yankaskas, "Analysis of cancers missed at screening mammography," Radiology, 184, pp. 613–617, 1992; J. A. Harvey, L. L. Fajardo, and C. A. Innis, "Previous mammograms in patients with impalpable breast carcinoma: retrospective vs blinded interpretation," AJR, 161, pp. 1167–1172, 1993) showed that 20–30% of cancers known to be visible on mammograms were missed by radiologists. The misses have been classified into two categories, namely search miss and interpretation miss (see H. L. Hundel, C. F. Nodine, and D. Carmody, "Visual scanning, pattern recognition and decision making in pulmonary nodule detection," Invest Radiology, vol. 13, pp. 175–181, 1978; C. J. Savage, A. G. Gale, E. F. Pawley, and A. R. M. Wilson, "To err is human, to compute divine," Proc. Second Int. Workshop on Digital Mammography [Elsevier, Amsterdam], A. G. Gale et al Eds, York UK, pp. 405–414, 1994). A search miss occurs when the radiologist simply does not see the abnormality. An interpretation miss occurs when the radiologist sees something but interprets it as something else. This invention provides an image visualization method to assist radiologists in overcoming these two types of misses in breast cancer diagnosis.

Studies also show that a second reading can increase by 5–15% the detection rate of breast cancer (see F. L. Thurfjell, K. A. Lernevall, and A. A. S. Taube, "Benefit of independent double reading in a population-based mammography screening program," Radiology, 191, pp. 241–244, 1994; R. E. Bird, "Professional quality assurance for mammographic screening programs," Radiology, 177, pp. 587–597, 1990). However, a second reading is expensive and time consuming. It reduces the efficient use of a radiologist's time as well as causing delays in patient throughput. Less than 2% of breast clinics do a second reading. Computer-aided diagnosis (CADx), computer-aided detection (CAD), and image analysis technique have shown potential for replacing a second reading.

CADx methods usually estimate the likelihood of the malignancy of a tumor that is detected by CAD. Current methods of CAD produce markers that indicate abnormalities. These marks are typically circles, arrows, or some form of annotation. The drawback of these methods is that numerous false positives distract radiologists from the subtle signs of disease not detected by CAD. The study conducted by Sittek et al (see H. Sittek and M. F. Reiser, "Initial clinical experience with CAD in mammography," Computer-Aided Diagnosis in Medical Imaging, K. Doi et al Eds, pp. 185–191, 1999) showed the false positive rate to be 94% in the only clinically available CAD-System ImageChecker (R2 Technology, USA). Image processing techniques can be used to improve the visualization of mammographic images. In one embodiment of the present invention, the contrast of an area of particular interest in a digital mammographic image, for example, the dense breast parenchymal pattern, is enhanced to help radiologists interpret the images. Another advantage of contrast enhancement is to overcome the dynamic range and modulation transfer function limitations of the output display media, such as radiographic film and monitor display.

More than 70% of breast cancers develop in the parenchymal zone. Cancers do not arise in the fat tissues because fat cells never divide. The breast parenchymal pattern contains the functional glandular elements (also called ductal elements, which are the milk channels) and stroma (connective and supporting tissues). The interpretation of a mammogram requires that radiologists visualize the 2 dimensional mammogram as the projection of a 3D anatomic object and to search ductal networks to detect cancers. In order to improve the ability of a radiologist to visually detect cancer on a digital mammogram, the appearance of breast parenchyma pattern must be enhanced relative to the fatty-tissue surroundings.

Contrast enhancement methods can be divided into two categories. The first category is called the single scale approach, where the image is processed in the original image domain, e.g., a simple look-up-table is used to transform the image. The second category is called the multi-scale approach, where the image is decomposed into multiple resolution scales and processing is performed in the multi-scale domain before the image is reconstructed back to the original image intensity domain.

The most common single scale methods make use of contrast stretch windowing as described in the work of Aylward et al (see S. R. Aylward, B. M. Hemminger, and E. D. Pisano, "Mixture modeling for digital mammogram display and analysis," Proc. Fourth Int. Workshop on Digital Mammography, [Kluwer, Bonston], N. Karssemeijer et al Eds, Nijmegen, Netherland, pp. 305–312, 1998). Because windowing is applied to one of the segmented image regions, such as uncompressed dense fat and muscle, at the expense of contrast reduction in other segments, a consequence of single scale methods is that the contrast in the area of dense breast tissue is increased at the cost of decreased contrast in the over-penetrated (darker) areas of the image, e.g., near the skin line. Mutihac et al (see R. Mutihac, A. A. Colavita, A. Cicuttin and A. E. Cerdeira, "Maximum entropy improvement of X-ray digital mammograms," Proc. Fourth Int. Workshop on Digital Mammography [Kluwer, Bonston], N. Karssemeijer et al Eds, Nijmegen, Netherland, pp. 329–336, 1998) describe a contrast enhancement method by maximizing entropy of the digital mammograms. This procedure requires prior knowledge to be stated as a set of constraints on the input image, for example, noise is independent of pixel value. For digital mammograms, this assumption is often invalid because of a strong correlation among neighboring pixels. These methods also require reliable estimates of standard deviations that are based on theoretical or experimental data. Morrow et al (see W. M. Morrow, R. B. Paranjape, R. M. Rangayyan, and J. E. Leo Desautels, "Region-based contrast enhancement of mammograms," IEEE Transactions on Medical Imaging, vol. 11, no. 3, pp. 392–405, 1992) describe another contrast enhancement method based on region growing. The region growing is initiated at the area of interest in test mammogram images that were identified with the aid of an experienced radiologist. A tolerance parameter k is selected such that if a pixel value is between (1−k)f to (1+k)f, then the pixel belongs to the region, where f is the gray value of the starting pixel. A new contrast is then reassigned based on the property of the region. Because the initial seed is selected manually, the practical utility of this method is reduced.

Among multi-scale approaches, un-sharp masking (USM) is a special case since the image is decomposed into two scales. The image is first passed through a low-pass filter to obtain a low resolution (low frequency) image. The high frequency image is obtained by subtracting the low frequency image from the original image. The high frequency components are then amplified and added back to the low frequency components to form a new image that has enhanced image detail. Many variations of USM have been developed. The method of Tahoces et al (see P. G. Tahoces, J. Correa, M. Souto, C. Gonzalez, and L. Gomez, "Enhancement of chest and breast radiography by automatic spatial filtering," IEEE Transactions on Medical Imaging, vol. 10, no. 3, pp. 330–335, 1991) combines two different un-sharp masking sizes (7×7 and 25×25) to achieve enhancement of high and median frequencies. Chang et al (see D. C. Chang and W. R. Wu, "Image contrast enhancement based on a histogram transformation of local standard deviation," IEEE Transactions on Medical Imaging, vol. 17, no. 4, pp. 518–531, 1998) and Narendra et al (see P. M. Narendra and R. C. Fitch, "Real-time adaptive contrast enhancement," IEEE Transactions on Pattern Ana. Machine Intell., vol. PAMI-3, pp. 655–661, 1981) describe a method of adaptively adjusting the gain of high frequency components based on the local standard deviation. Ji et al (see T.-L. Ji, M. K. Sundareshan, and H. Roehrig, "Adaptive image contrast enhancement based on human visual properties," IEEE Transactions on Medical Imaging, vol. 13, no. 4, pp. 575–586, 1994) describe how to adjust high frequency components by using human visual properties. These three methods are variations of the well-known un-sharp masking technique applied to digital mammography. All three methods cause dark and bright banding artifacts around high contrast edges, known as edge-banding artifacts. The edge-banding artifact is objectionable in areas where there are rapid changes in the image, for example, at the sharp boundaries between the skin line and the air-background in a mammogram.

To deal with the edge-banding problem, methods have been developed that are based on decomposing an image into multiple resolutions and using a predetermined nonlinear function to compress the high amplitude of the high frequency component in each resolution. Vuylsteke et al (see U.S. Pat. No. 5,467,404, "Method and apparatus for contrast enhancement," Nov. 14, 1995, P. P. Vuylsteke and E. P. Schoeters), Clark et al (see U.S. Pat. No. 5,982,917, "Computer-assisted method and apparatus for displaying X-ray images," Nov. 9, 1999, L. P. Clarke, W. Qian, and L. Li), Laine et al (see A. F. Laine, S. Schuler, J. Fan, and W. Huda, "Mammographic feature enhancement by multi-scale analysis," IEEE Transactions on Medical Imaging, vol. 13, no. 4, pp. 725–740, 1994), and Strickland et al (see R. N. Strickland, L. J. Baig, W. J. Dallas, and E. A. Krupinski, "Wavelet-based image enhancement as an instrument for viewing CAD data," Proc. Third Int. Workshop on Digital Mammography [Elsevier, Amsterdam], K. Doi et al Eds, Chicago, Ill., pp. 441–446, 1996) used the combination of linear and nonlinear compression functions for the high frequency components in each resolution. Takeo et al (see U.S. Pat. No. 6,014,474, "Image processing method and apparatus," Jan. 11, 2000, H. Takeo, M. Yamada and N. Nakajima) used a morphology operator as a nonlinear compression function for the high frequency components. In the above-mentioned methods, if the high frequency amplitude is large, then it is attenuated. If the high frequency amplitude is small, it is passed unchanged or even amplified. All these methods assume that whenever the signal amplitude gets large, regardless of the cause, the amplitude should be reduced such that overshoot and undershoot artifacts near sharp edges are properly suppressed. The general purpose of contrast enhancement is to facilitate useful image information to be visually extracted without the addition of artifacts. To attain optimal contrast enhancement of an image for visual interpretation, two problems are to be addressed. The first is to identify specifically which image details should be enhanced. The second problem is to determine the degree of enhancement. The methods described in the prior art fail to address these two problems adequately for digital mammography. First, the amplitude information at each resolution is inadequate to determine whether a large amplitude is caused by a high contrast edge (e.g., from muscle to fat) or an area of interest (e.g., from ducts to fat). Failure to make the distinction between useful edges and abundant edges will also cause the suppression of fine details associated with high amplitudes, resulting in a loss of important image detail. Second, a predetermined nonlinear amplitude compression function is not sufficient to adaptively enhance the amount of image detail for each resolution at different spatial locations.

There is an image modality, called xerography, which produces edge-enhanced images that have a look similar to the mountain-view presentation. Applying the xerographic reproduction process to the breast began in 1956. The major differences between conventional radiography and Xeroradiography are: (1) the latent image is formed by photoconduction on a selenium surface plate and developed by a dry process; (2) a permanent image is recorded on opaque paper; (3) edge enhancement is often greater. The edges of the denser area in the breast are usually more pronounced than in fine-grain film mammography. Xeroradiography was also somewhat more successful in imaging the breast with an implant. This is not only because the wide latitude of the imaging process permitted simultaneous display of the full range of native breast tissues and the more opaque implant itself, but also because the standard lateral projection image routinely depicted all portions of the implant, including its posterior margins (see E. A. Sickles, "Breast imaging: from 1965 to the present," Radiology, 215, pp. 1–16, 2000). However, Xerography has been discontinued in breast imaging for about 25 years. The major disadvantages of xerography are: (1) more radiation by a large factor; (2) messy (due to toner process); (3) more expensive.

SUMMARY OF THE INVENTION

According to the present invention, there is provided a solution to the problems and fulfillment of the needs discussed above.

According to a feature of the present invention, there is provided a method for improving disease diagnosis using contrast enhancement presentation comprising:

providing an input digital diagnostic image;

applying a decomposition filter bank to said input digital diagnostic image;

constructing a tone scale curve from said input digital diagnostic image;

applying said tone scale curve to said input digital diagnosis image to produce a tone-scaled image;

applying a decomposition filter bank to said tone-scaled image;

generating contrast weight control signals from the input digital diagnosis image by extracting high contrast edge signals at the coarse scale;

adjusting decomposition outputs from both the input image and the tone-scaled image according to the contrast weight control signals; and applying a reconstruction filter bank to the adjusted signals to produce a contrast enhancement presentation output image.

ADVANTAGEOUS EFFECT OF THE INVENTION

The invention provides a general method of enhancing the breast image contrast without adding the edge-banding artifacts around high-contrast edges. The invention has the following advantages.

1. Produces breast images with an appearance that facilitates radiologist detection of breast cancer thereby helping to reduce the number of search misses.

2. Enhances the appearance of duct and stroma characteristics in digital mammographic images that facilitates radiologist diagnosis of breast cancer thereby helping to overcome interpretation misses.

3. Optimal contrast enhancement of an image for visual interpretation is achieved by identifying specifically which image details should be enhanced.

4. Optimal contrast enhancement of an image for visual interpretation is achieved by determining the degree of enhancement.

5. The advantages of Xeroradiography are achieved without additional radiation and the messy toner process.

BRIEF DESCRIPTION OF THE DRAWINGS

FIG. 4 is a graphical view showing the filter coefficients in the preferred filter banks.

DETAILED DESCRIPTION OF THE INVENTION

Figure 1:
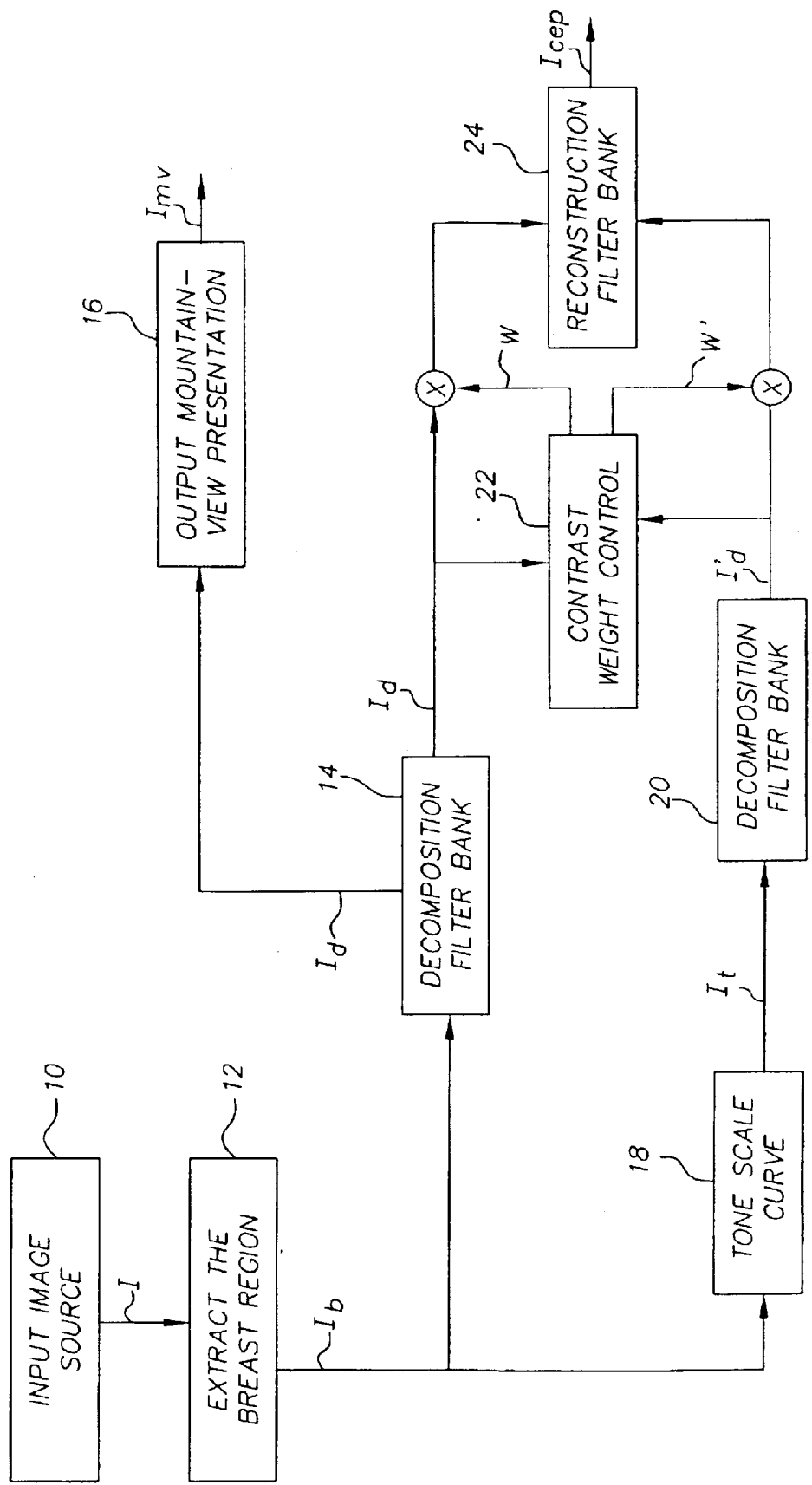
FIG. 1 is a block diagram of one embodiment of this invention. There are two output images. One output is a mountain-view presentation. The other output is a contrast-enhancement presentation.

An overview of the invention is illustrated in FIG. 1. The input digital image I from source 10 is first passed into the skin line detection and breast region extraction algorithm 12 to extract the anatomic breast region in the image. Usually, only ⅔ of a digital mammographic image contains the breast, while the other ⅓ contains the background. Because the background does not have diagnostic information, it is not necessary to process or display the entire image including the background. The image containing only breast region is called preprocessed image, $I_b$.

There are two output images in FIG. 1. The first output is the mountain-view presentation $I_{mv}$. The preprocessed input image $I_b$ is passed through the decomposition filter bank 14 to produce $I_d$. This multiscale edge representation 16 shows a mountain (or hill) presentation $I_{mv}$ of the input image. The mountains are the areas containing high-contrast edges. Instead of displaying the image in the traditional intensity domain, the mountain-view presentation displays the image in a multi-scale edge domain. Therefore, high-contrast edges are displayed in an enhanced manner.

A second output image, called contrast enhancement presentation $I_{cep}$, is shown in the lower half of FIG. 1. The preprocessed input image $I_b$ is processed using a tone scale (by convention the tone scale is defined as the log exposure to density conversion) curve 18 (producing $I_t$) before it passed through the decomposition filter bank 20 to produce $I'_d$. The task of tone scaling is to map the dynamic range of the input original image into the dynamic range of the output display medium. After an optimized visualization tone scale is applied to an input image, the output looks pleasing when it is printed digitally. However, the image details still need to be enhanced in the tone-scaled image. This invention discloses a contrast weight control mechanism 22 to produce the desired weighting factors, W, and W', to combine the respective outputs $I_d$ and $I'_d$ from filter banks 14, 20. Then the output image is reconstructed using a reconstruction filter bank 24. Because the edge information is determined at the coarse scale and adjusted at each scale before it is input to the reconstruction filter bank, the output reconstructed image $I_{cep}$ contains useful enhanced image details, and also contains a right dynamic range to match the intended output medium. The output image $I_{cep}$ is in the same intensity domain as is the input image I.

The input digital mammographic images can be captured and digitized by various imaging devices. It is important to calibrate the digital image to the desired metric. In the following description of this invention, all images are calibrated to relative log X-ray exposure. For convenience, the relative log X-ray exposure is scaled up by a factor of 1000 so that one can use only integer values to represent the input and output images. However, the intermediate results from the various filters are represented as floating point numbers, so that proper precision is always retained.

Figure 2:
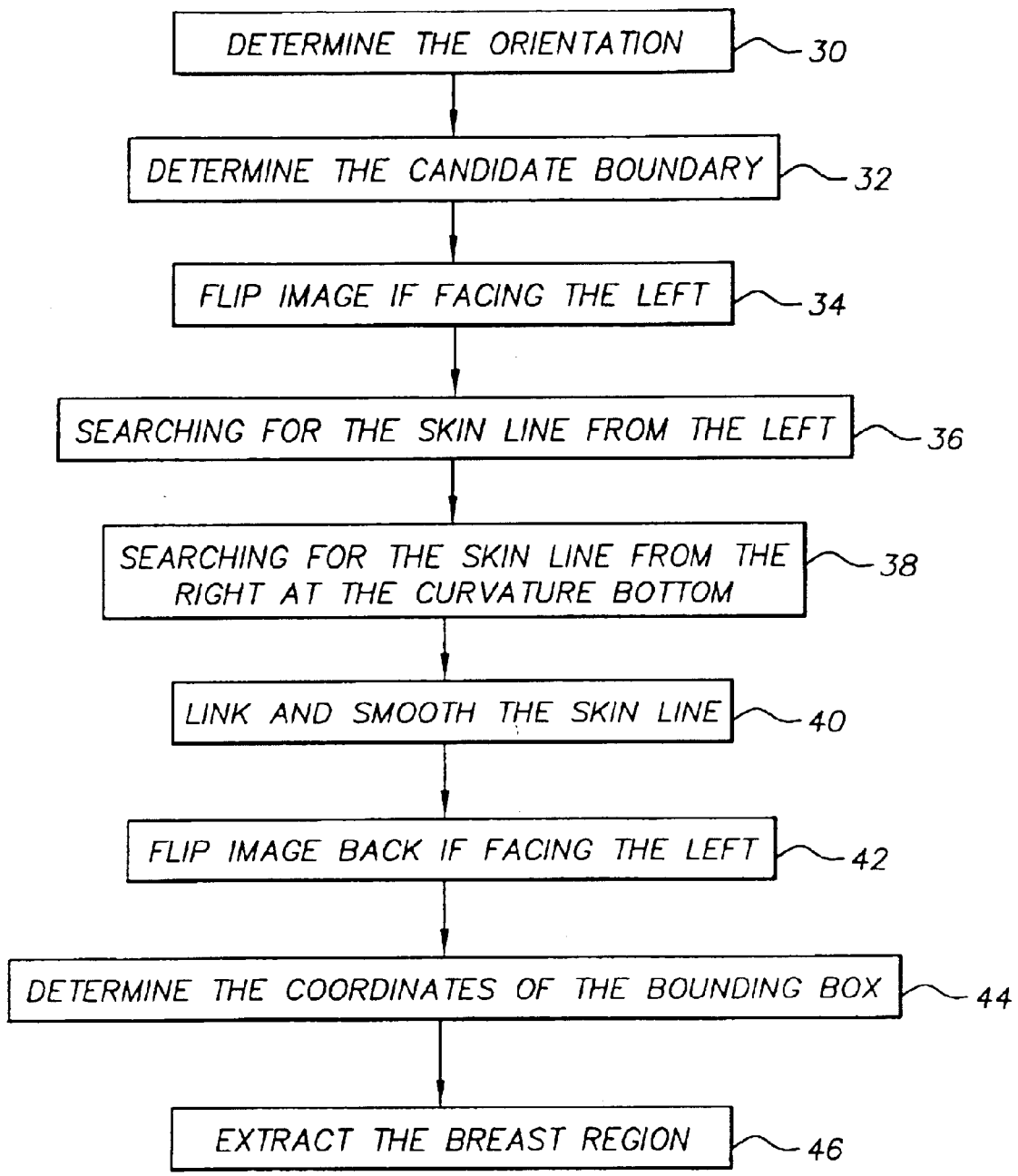
FIG. 2 is a block diagram of the skin line and the breast region extraction algorithm.

The detailed procedures of this invention are described in the following three sections:

Preprocessing—an algorithm for detecting the skin line before extracting the breast region Mountain-view presentation method Contrast-enhancement presentation method 1. Breast Region Extraction In this invention, the breast skin line is extracted first then a bounding box containing the breast is determined. FIG. 2 is a block diagram of a method for determining the skin line and the bounding box detection. The first step (box 30) in FIG. 2 is to determine the orientation of the breast in the digital mammographic image, that is, to determine whether the breast is facing to the right or to the left. Typically, the mammographic images are presented such that the breast region is located either on the left or the right side of a mammogram. If the breast is located on the left, it is an image of the left breast and it indicates the breast facing right, and vice versa. In general, the pixel values of the breast region are very different from those of the air-background. For example, the pixels of the air-background are high values (usually close to the maximum code value in the image) appearing dark (high exposure), while, the pixels values for the breast region are low corresponding to less x-ray penetration. Thus, the orientation of the anatomy can be determined by the summation of the pixel values of each side. The side with the smaller sum is the side containing the breast region indicating the breast is facing the other side. The algorithm then determines the candidate breast boundary (box 32) by setting a threshold on the mammogram. Since the pixels of the air-background contain high code values, close to the maximum value of the mammographic image, the threshold value is selected as a fraction of the maximum value, that is α x max, where α is selected close to 1. Therefore, there are no pixels of the breast region that are mis-classified as air-background. A binary image is obtained where the candidate breast region has 0 value and the air-background has the value of 1.

Since a digital mammographic image may contain some objects other than breast tissues and air-background, such as lead markers, labels, etc., the pixels in these objects contain low values close to the breast region. The candidate breast region may contain these objects. In order to determine the breast region, the skin line is determined in the next step (box 36). To avoid searching for the skin line from the wrong side, the algorithm always starts searching from the chest wall side. If the breast is facing left, the image is flipped (box 34). Within a line passing through the breast and the labels, the pixel with the value 1 appears first at the transition from the skin line to the air-background and then appears at the transition from the air-background to the label. The first appearing pixel is selected as the location of the skin pixel on that line. So, searching from the chest wall can avoid the wrong decision of the labels or lead markers as the breast region. However, when the search reaches the curved bottom of the breast, the pixel value 1 will appear twice, both of them at the transition from the skin line to the air-background. When the search reaches the bottom of the breast, in order to detect the skin line from the right of the curvature, the search goes from the right (box 38). Now at the line-by-line base, each skin line pixel is obtained. Because of the binary process, the skin line obtained so far may not be continuous. Therefore, the next step is to link and smooth the skin line (box 40). The image is flipped back if facing let (box 42). From the skin line pixels, the coordinates of the bounding box containing the breast is determined by adding extra pixels in both the x and y directions (box 44). Then the breast region is extracted according to the bounding box (box 46). The number of extra pixels can be selected as a reasonable value. For a mammogram with a resolution of 100 micrometers, an extra 80 pixels adds 8 mm distance around the skin line. The output image looks natural.

2. Mountain-View Presentation (1) Filter Banks

There is a technique that is used to detect edges by computing image gradients. However, it is not enough to simply compute the image gradient between the neighboring pixels because the change or difference could be small. It is natural to examine edges at different resolution scales. The important edges where radiologists look for a sign of cancers are the high-contrast edges at coarse levels where subtle image details have been smoothed out and only the high-contrast edges are left. In this invention a tool called multiresolution edge decomposition is utilized through filter banks. The filters in the decomposition filter bank are designed as the edge detector. Because the DC component is removed from the image, the output of decomposition contains fine details of the input image in different scales. This output is also called multiscale edge representation. For a given scale, the local edges can be displayed very pronouncedly, even for the small microcalcifications.

Figure 3A:
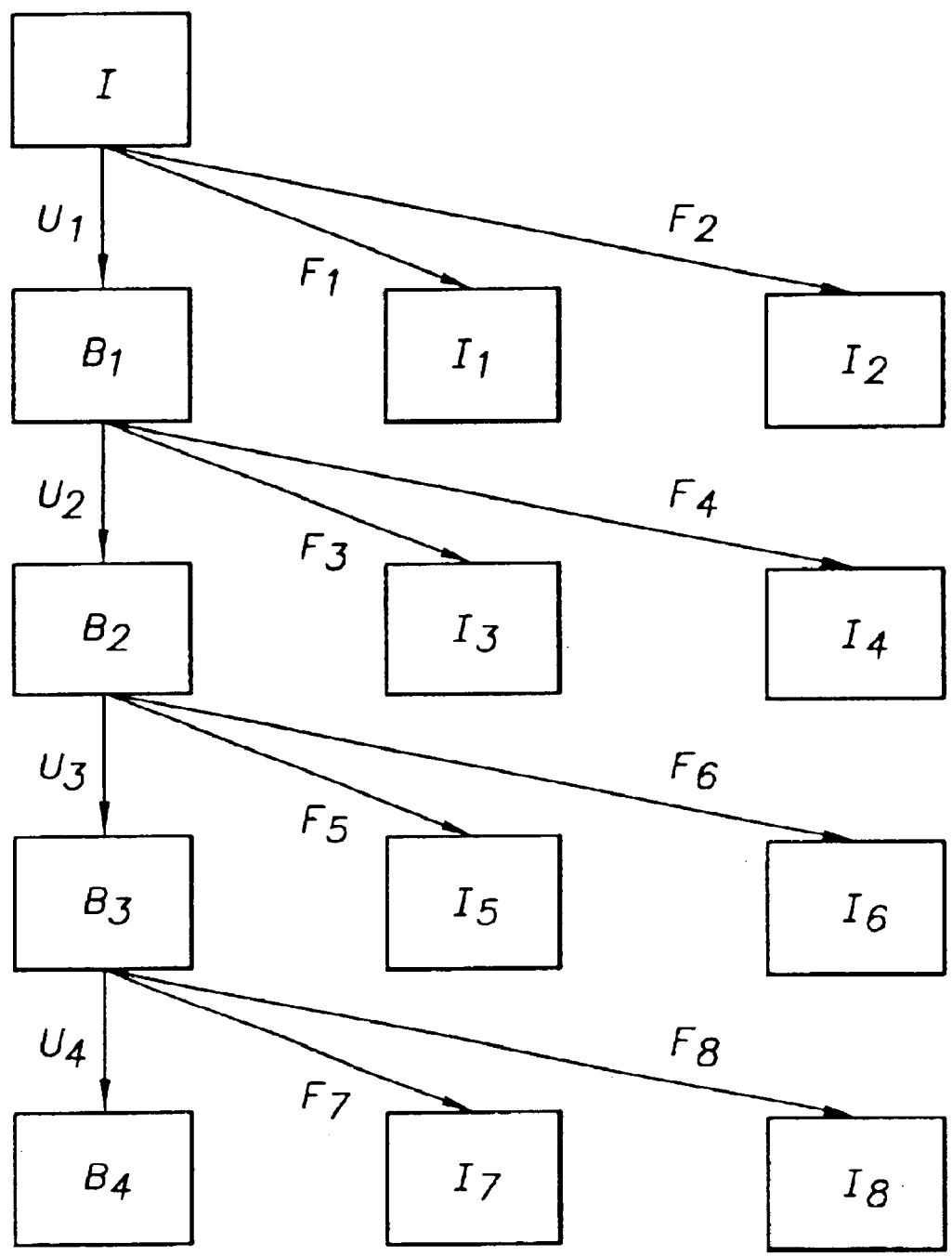
FIGS. 3a and 3b are diagrammatic views of the filter banks (FB) module (decomposition and reconstruction).
Figure 3B:
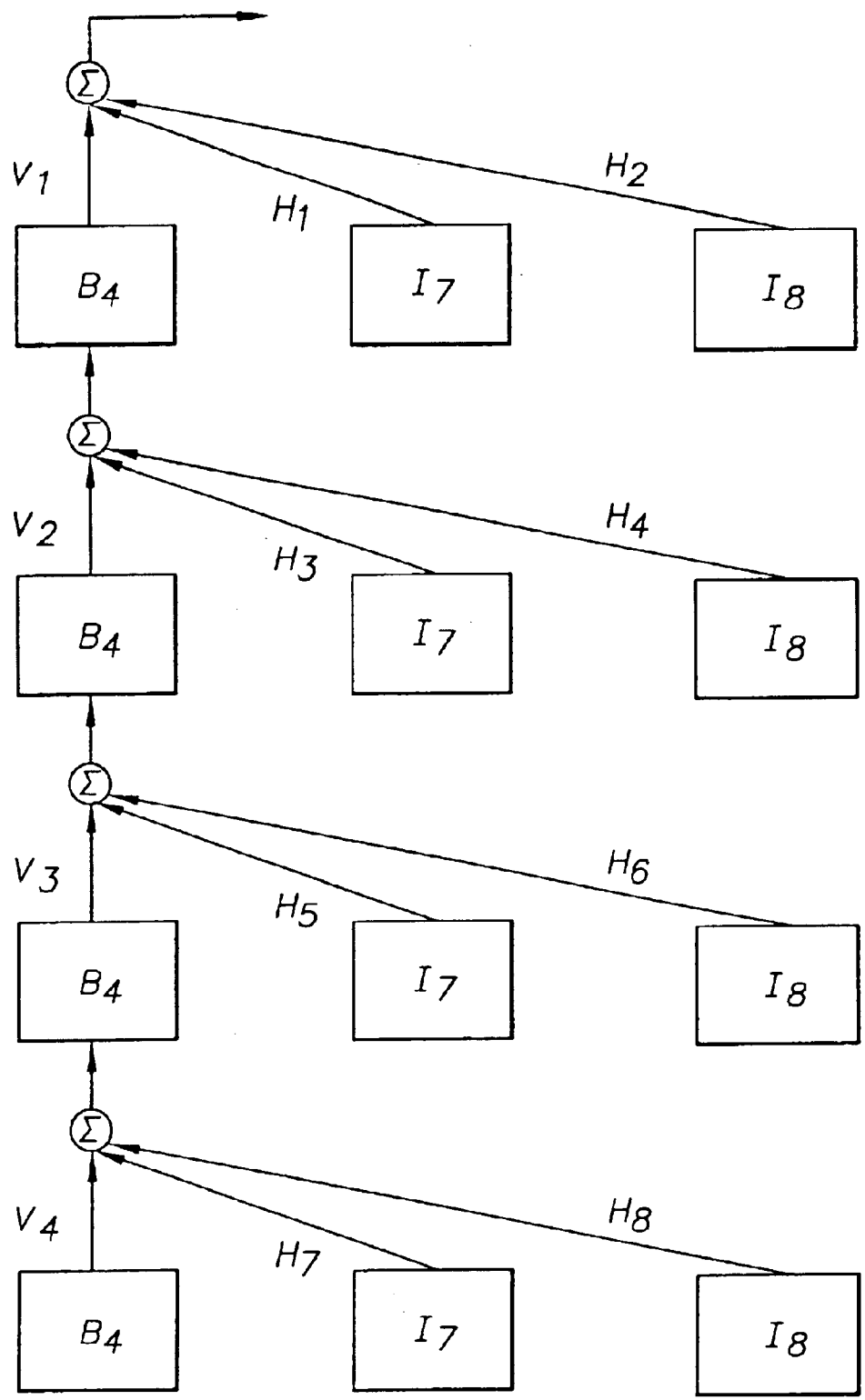

The details of Filter Banks are shown in FIG. 3. FIG. 3a contains decomposition modules and FIG. 3b reconstruction modules. Because the reconstruction module is used in Contrast-Enhancement Presentation, for convenience, we describe these two modules together here. The task of the filter banks is to extract the high frequency details, and to remove the very low frequency (DC) component.

The number of filter paths, N, is determined by cost and system throughput constraints. As the number of filter paths increases, the banding artifact is reduced because more frequency channels allow the shape edges to be suppressed more successfully as a function of a spatial scale. Referring to FIGS. 3a and 3b, the filter banks in this invention separate each filter path into two paths, $F_i$, and $H_i$. Filter $F_i$ is designed to be an edge detector in different spatial scales and orientations. The output from filter $F_i$ represents edge signals at a particular scale in a particular spatial orientation. It is this explicit edge contrast signal that is manipulated to display as an output image to produce the mountain-view presentation.

Filter $H_i$ is required to reconstruct the image. There are many possible choices for the decomposition—reconstruction filter pairs. The number of filter paths, the image resolution, and the image size will constrain the choices to a few for an efficient implementation. In the preferred embodiment, four frequency bands and two spatial orientations (vertical and horizontal) are selected, making the total number of paths equal to N=4×2=8. Let $\omega_x$ and $\omega_y$ be the spatial angular frequency in the x and y directions. The filters have the following frequency responses:

$$U_k(\omega_x, \omega_y) = \prod_{i=1}^{k} S(2^{i-1}\omega_x)S(2^{i-1}\omega_y),$$

k=1, 2, . . . , N/2, $U_0(\omega_x, \omega_y)$=1

$F_k(\omega_x, \omega_y)=U_{(k-1)/2}(\omega_x, \omega_y)R(2^{(k-1)/2}\omega_x)$, k=1, 3, . . . , N-1 (k is an odd number)

$F_k(\omega_x, \omega_y)=U_{(k-2)/2}(\omega_x, \omega_y)R(2^{(k-2)/2}\omega_y)$, k=2, 4, . . . , N (k is an even number)

$$V_k(\omega_x, \omega_y) = \prod_{i=1}^{k} P(2^{i-1}\omega_x)P(2^{i-1}\omega_y),$$

k=1, 2, . . . , N/2, $V_0(\omega_x, \omega_y)$=1

$H_k(\omega_x, \omega_y)=V_{(k-1)/2}(\omega_x, \omega_y)Q(2^{(k-1)/2}\omega_x)L(2^{(k-1)/2}\omega_y)$, k=1, 3, . . . , N-1 (k is an odd number)

$H_k(\omega_x, \omega_y)=V_{(k-2)/2}(\omega_x, \omega_y)L(2^{(k-2)/2}\omega_x)Q(2^{(k-2)/2}\omega_y)$, k=2, 4, . . . , N (k is a even number)

where $$S(\omega) = \cos^4\left(\frac{\omega}{2}\right)$$

$$R(\omega) = i\sin\left(\frac{\omega}{2}\right)e^{i\omega/2}$$

$$P(\omega)=S(\omega)$$

$$Q(\omega)=[1-S^2(\omega)]/R(\omega)$$

$$L(\omega)=[1+S^2(\omega)]/2$$

These filters are from the family of edge-wavelet filters that were used in Mallat and S. Zhong's paper, "Characterization of signals from multiscale edges," *IEEE Transactions on Pattern Analysis and Machine Intelligence*, 14, 7, 710–732, 1992. From the definition of Fourier transform of a sampled function $f(n)$:

$$F(\omega) = \sum_{n=-\infty}^{\infty} f(n)e^{-i\omega n}$$

$$f(n) = \frac{1}{2\pi}\int_{-\pi}^{\pi} F(\omega)e^{i\omega n}d\omega$$

The filter coefficients are derived as shown in FIG. 4.

(2) Output Mountain-view Presentation Image

Figure 5:
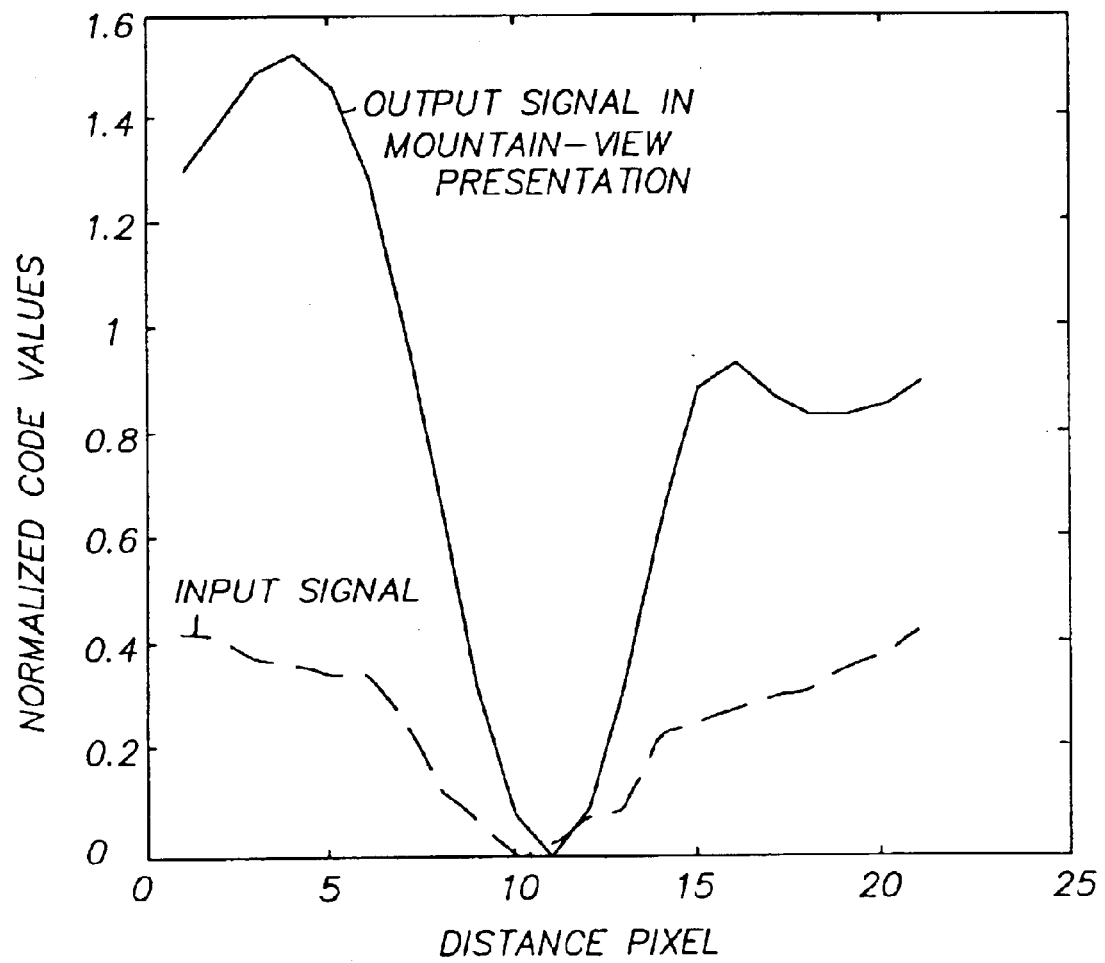
FIG. 5 is a graphical view showing a comparison of the input signal profile (dashed line) of a line crossing a microcalcification in the input image I and the output signal profile (solid line) of the same line through the output mountain-view image $I_{mv}$.

The output image from filter $F_i$ is indented to display the high contrast of image fine details to draw the radiologists' attention to a possible pathology. FIG. 5 displays the comparison of the input signal profile of a line crossing a microcalcification in the input image I and the output signal profile of the same line through the output image $I_{mv}$. The contrast between the calcification and the surroundings is increased 10 times.

Figure 6:
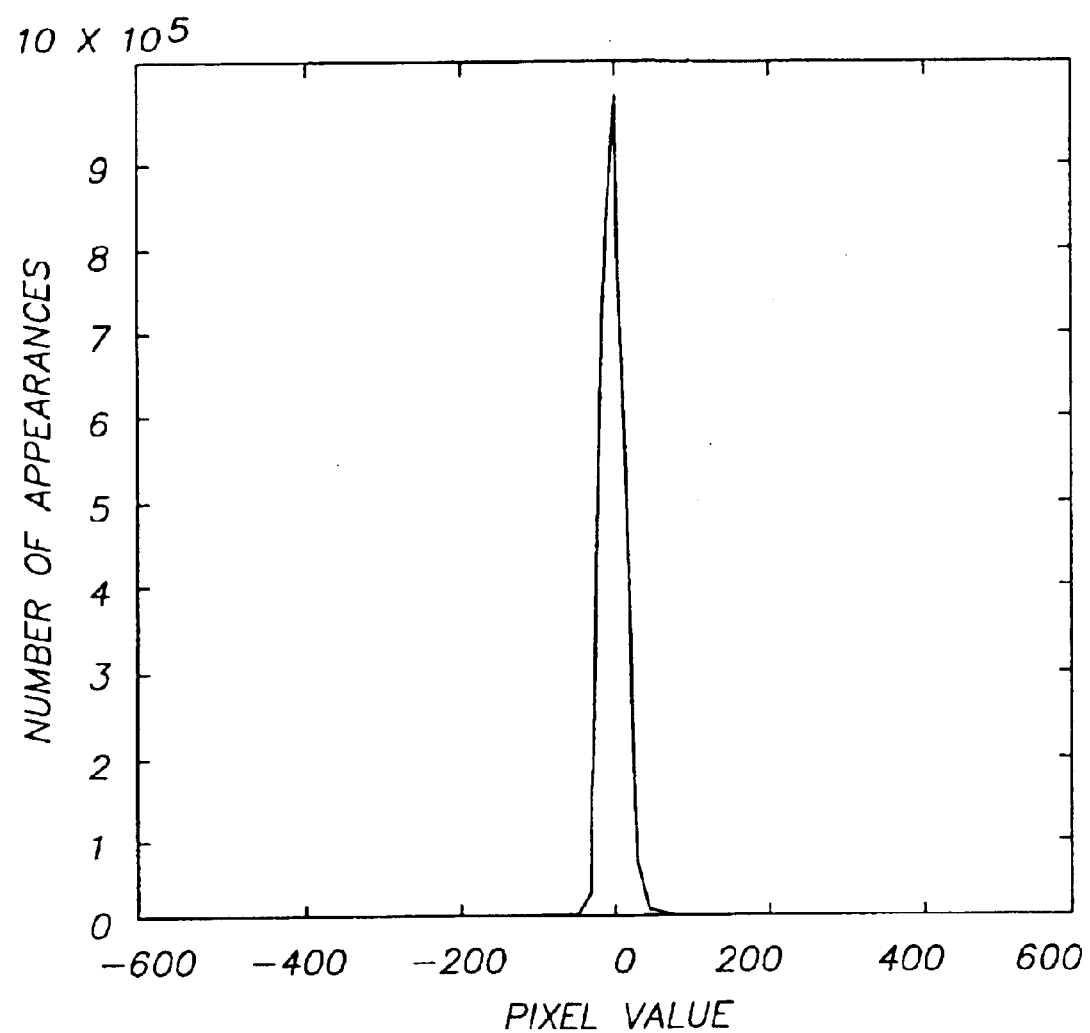
FIG. 6 is a graphical view showing an example of the histogram of a mountain-view presentation image.

In a preferred embodiment, this mountain-view image is displayed in a softcopy environment on a display monitor. The histogram of this output image at k=6 is shown in FIG. 6. It can be observed that there is only one peak with a narrow range similar to the Laplasian distribution. In order to maximize the visualization of the high contrast edges, a windowing technique is used to display this mountain-view image. First, the peak is searched and the position of the peak is selected as the window center. Then the algorithm finds the left value of the window by searching down the left of the peak until the histogram becomes too small. Similarly, the right value of the window is located to the right of the peak. The window width is calculated as the right value minus the left value. The mountain-view presentation image is displayed in an output medium such that the window width is stretched to fit the output medium range to maximize the visualization of high contrast edges.

3. Contrast-Enhancement Presentation

Figure 7A:
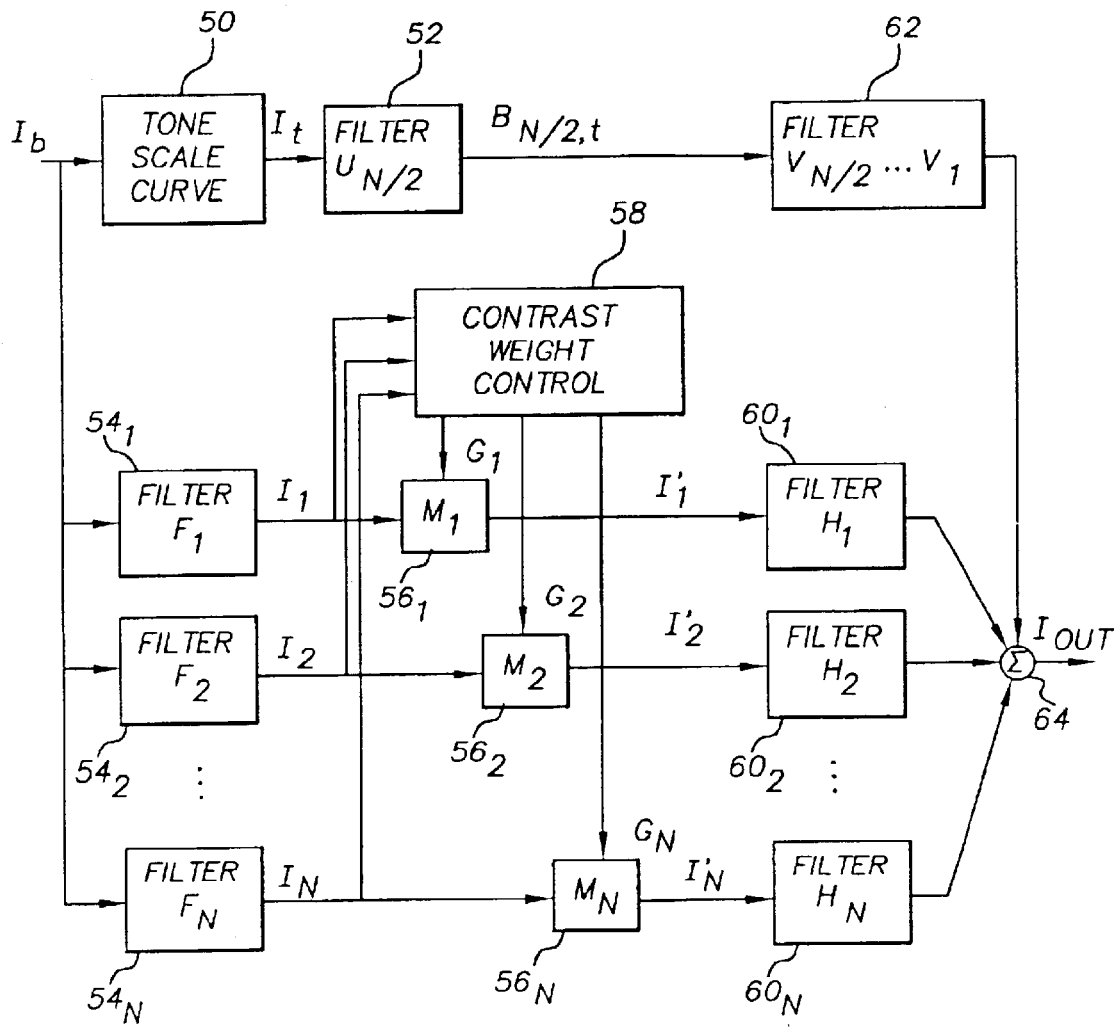
FIGS. 7a and 7b are block diagrams showing two preferred embodiments of this invention.
Figure 7B:
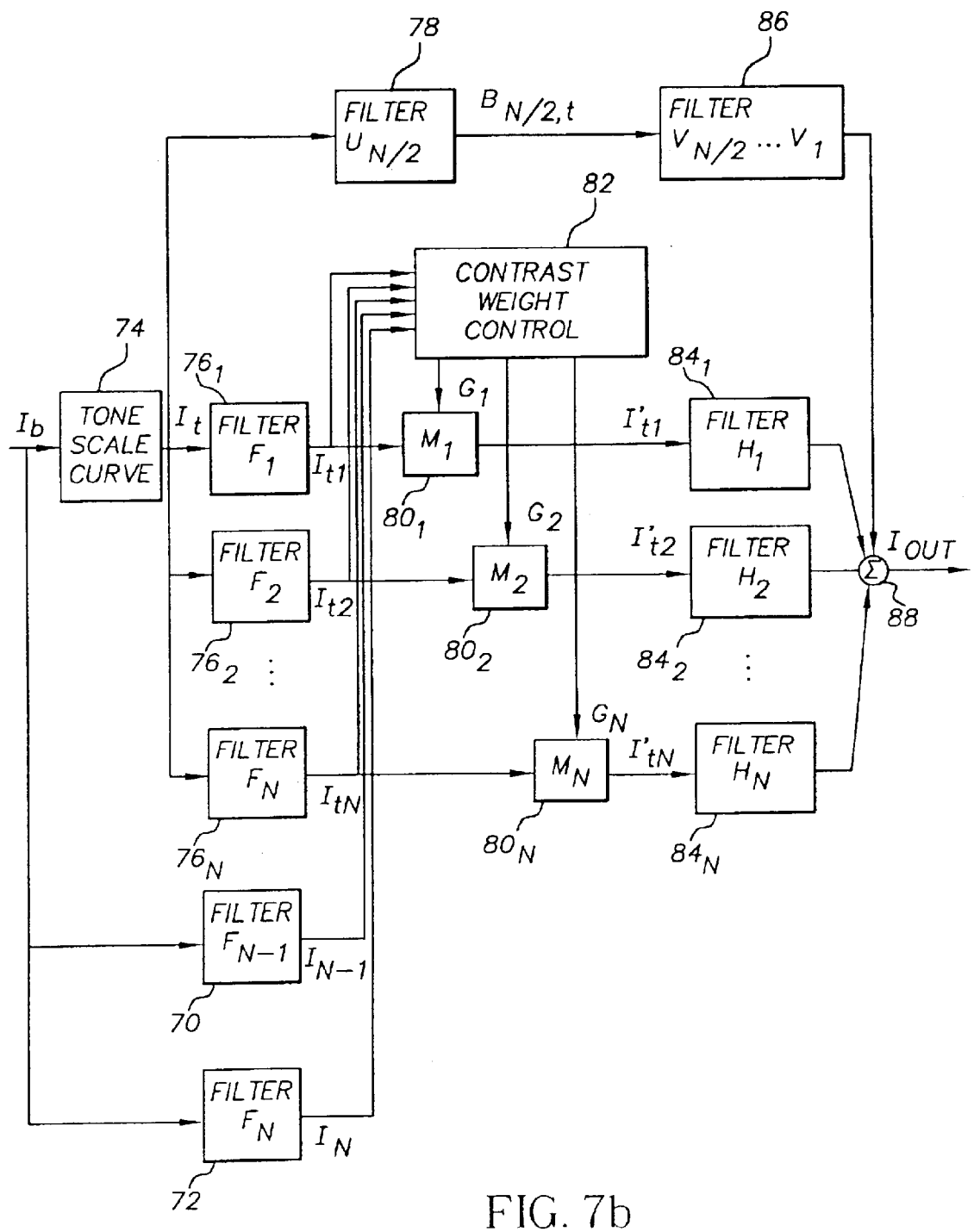

The invention as shown in FIG. 1 can be performed more efficiently by two different embodiments shown in FIGS. 7a and 7b. Instead of processing the original version of the input image and its tone-scaled version through the decomposition filter bank separately, the new embodiments only process one of the versions and the coarsest scale of the other version. FIG. 7a shows the first embodiment where the preprocessed image $I_b$ is processed in the tone scale curve algorithm 50 to produce a tone-scaled image $I_t$. The tone-scaled image is then passed through a filter $U_{N/2}$ 52 to produce the coarsest scale $B_{N/2,t}$. The preprocessed input image $I_b$, in another pass, is passed through a filter bank, consisting of a set of N decomposition filters $F_1, F_2, \ldots, F_N$, $54_1, 54_2, \ldots, 54_n$. The main function of the filters $54_1$–$54_n$ in this invention is to extract the image edge features, which are considered as desirable targets for enhancement. The output $I_1, I_2, \ldots, I_N$ from each of the filters $54_1$–$54_n$ is modulated in modulators $M_1, M_2, \ldots, M_N$, $56_1$–$56_n$, respectively, by a gain-control signal $G_1$–$G_n$, which is produced by the contrast weight control generator 58 from the decomposition signals $I_1$–$I_n$ of the original input image I. All the gain-adjusted signals $I'_1, I'_2, \ldots, I'_N$, together with the low pass filtered signal from the tone-scaled image, $B_{N/2,t}$, are then passed through a set of reconstruction filter banks 60, $H_1, H_2, \ldots, H_N$, and 62 $V_1, \ldots, V_{N/2}$ and summed in adder 64 to produce the desired output image, $I_{out}$.

FIG. 7b shows the second embodiment. The preprocessed input image $I_b$ is passed through two filters $F_{N-1}$ and $F_N$, 70, 72 to produce the coarsest edge signals, $I_{N-1}$ and $I_N$ respectively. In a parallel path, the preprocessed image $I_b$ is processed in the tone scale curve algorithm 74 to produce a tone-scaled image $I_t$. Then, the tone-scaled image is passed through a filter bank, consisting of a set of N decomposition filters $F_1, F_2, \ldots, F_N$, $76_1$–$76_n$, and one low pass filter $U_{N/2}$ 78. The tone-scaled version output $I_{t1}, I_{t2}, \ldots, I_{tN}$ from the filter bank is modulated in modulators in $M_1, M_2, \ldots, M_N$ $80_1$–$80_n$ by a gain-control signal $G_1$–$G_n$, which is produced by the contrast weight control generator. The contrast weight control generator 82 in this embodiment is generated from all the output of the decomposition filter bank of the tone-scaled image $I_{t1}$–$I_{tN}$ as well as the output of coarsest scale of the original image $I_b$, $I_{N-1}$, $I_N$. Then the gain-adjusted signals $I'_{t1}, I'_{t2}, \ldots, I'_{tN}$, together with the low pass filtered tone-scaled image, $B_{N/2,t}$, are passed through a set of reconstruction filter banks, $H_1, H_2, \ldots, H_N$, $84_1$–$84_n$ and $V_1, \ldots, V_{N/2}$, 86 and summed on adder 88 to produce the desired output image, $I_{out}$.

The contrast-enhancement presentation in FIGS. 7a and 7b consists of three major modules: (1) tone scale curve module, (2) contrast weight control module, and (3) filter banks module. The filter banks module is already described in the Mountain-view Presentation section. The Tone Scale Curve module and The Contrast Weight Control module will be described in detail in this section.

(1) Tone Scale Curve Module

Figure 8:
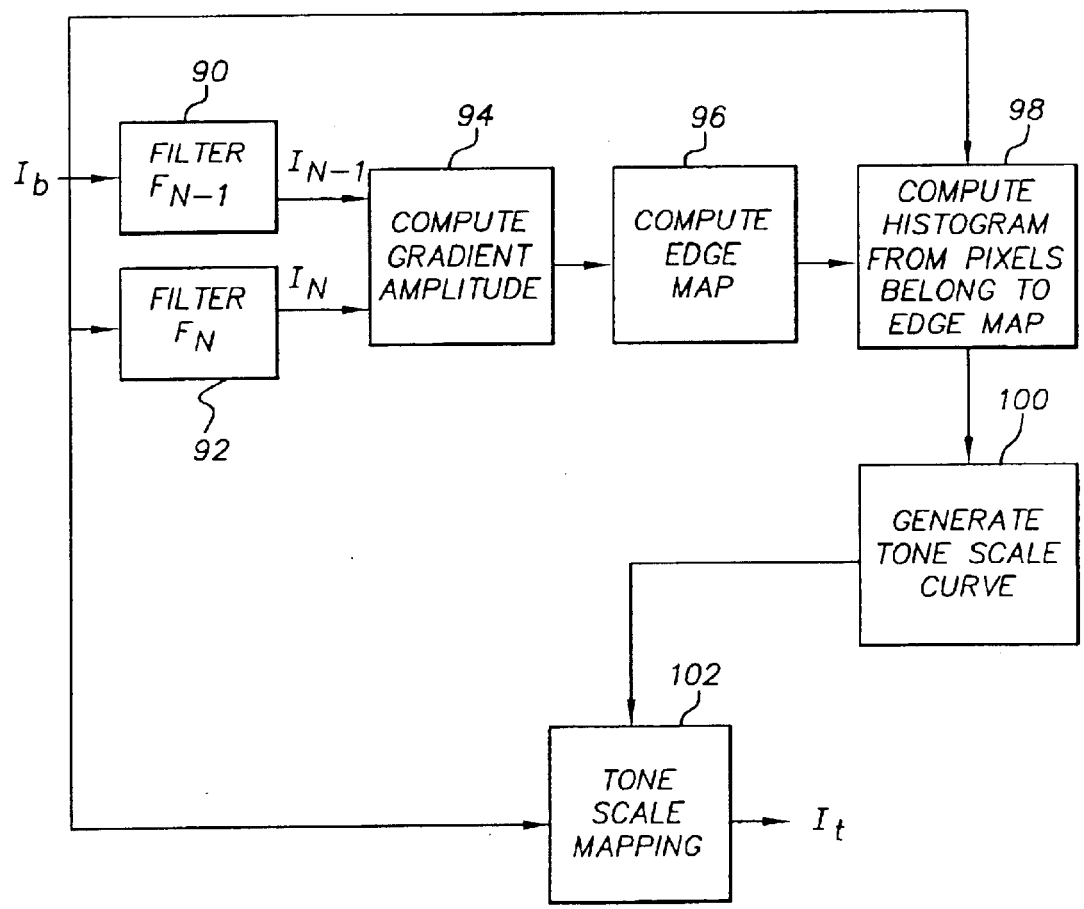
FIG. 8 is a block diagram of the tone scale module.

FIG. 8 shows a diagram of the Tone Scale Curve module. This module computes a unique tone scale curve for each input digital mammographic image and applies it to produce a tone-scaled version of the input image. The major function of the tone scale curve is to stretch or compress the dynamic range of the input image into a dynamic range of the output medium so that the output medium can render the image effectively. Lee et al (see U.S. Pat. No. 5,633,511, "Automatic tone scale adjustment using image activity measures," H-C. Lee, L. L. Barski, and R. A. Senn) taught a method of generating a tone scale that is visually optimized for radiographic images. The crucial input to this method is the four points (the far-left, the left, the right, and the far-right) representing the portion of the dynamic range that corresponds to the region of interest in the input image.

The region of interest in a mammographic image is the location of ducts where breast cancers arise. Since locating the ducts themselves in a mammogram is very difficult, radiologists pay special attention to the ducts and stroma in a mammograhic image to detect any abnormalities that could lead to a cancer. Therefore, the ducts and stroma need to be adequately visualized. In this invention, the ducts and stroma are located as the local high contrast edges in a coarse scale where other image details are smoothed out. Because of image noise in the image formation process, simply computing the edges through the gradient amplitudes among the neighboring pixels causes a lot of false alarms. The reliable method of extracting the ducts and stroma in the mammographic image is to extract the high contrast edges in a coarse scale. Then a histogram that represents the code value distribution of ducts and stroma is obtained. Because this histogram represents the distribution of the image pattern of interest in an image, this histogram is called the image pattern histogram. The four points that represent the dynamic range of the ducts and stroma structures of an input image are determined from its image pattern histogram generated in a coarse scale.

Figure 9:
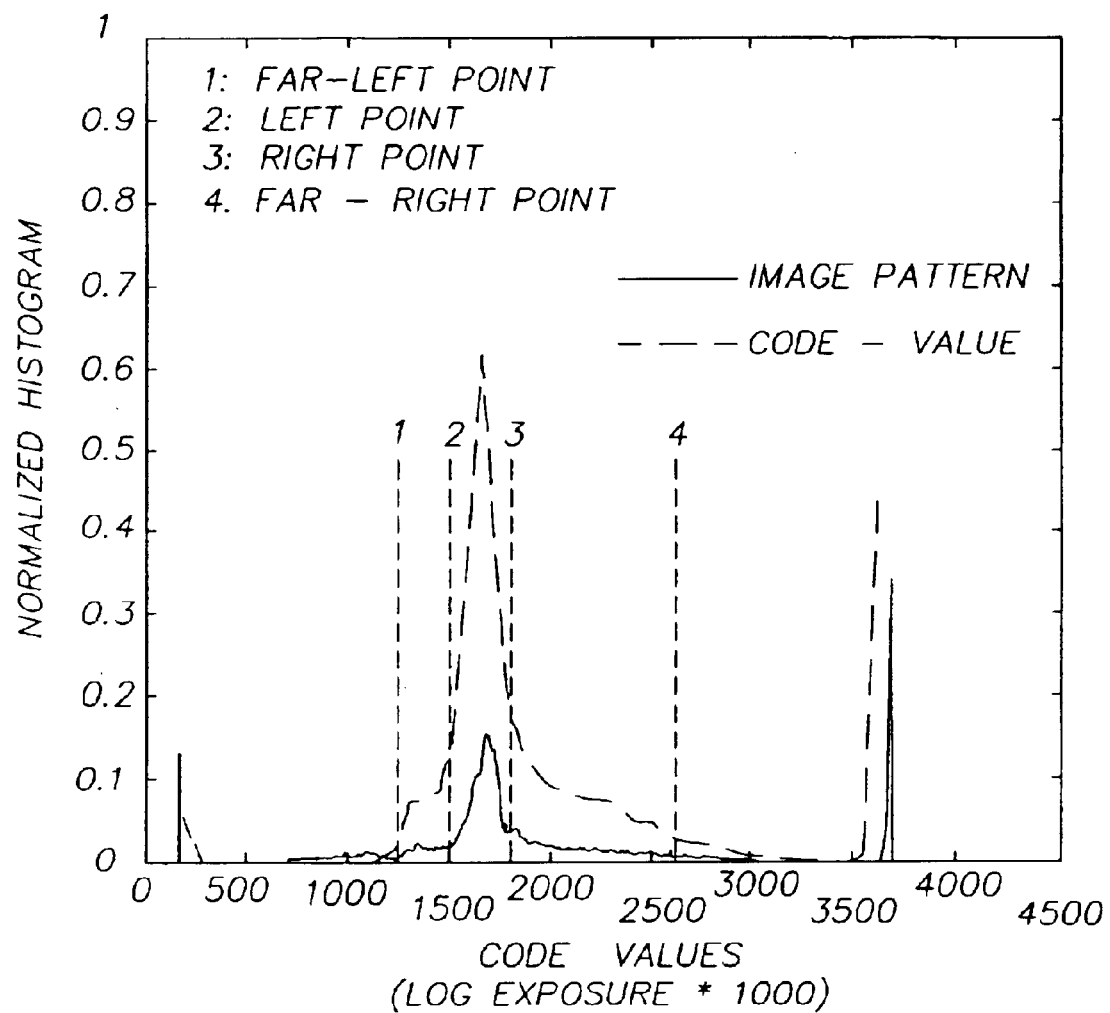
FIG. 9 is a graphical view showing an example of the image pattern histogram (solid line) and the code-value histogram (dashed line).

In FIG. 8, the first step in the tone scale curve module is that the preprocessd input image $I_b$ is filtered through two filters 90, 92 in the filter bank, $F_{N-1}$ and $F_N$. These two filters 90, 92 produce the edge information in the horizontal and vertical directions in the coarsest resolution N/2. In the preferred embodiment, N=8. The algorithm then computes the edge gradient from the filters output, $I_{N-1}$ and $I_N$. The edge gradient amplitude is computed 94 by taking the square root of the sum of the square of $I_{N-1}$ and the square of $I_N$. Next, the algorithm computes the edge map 96 by finding the local maximum gradient magnitude along the gradient direction. The edge map is a binary image where the pixel value 1 represents the local maximum gradient pixel and the pixel value 0 represents other pixels. The image pattern histogram is computed 98 from the input image pixels that are the local maximum gradient pixels (belonging to the edge map) at the coarsest resolution. This histogram represents the code value distribution of the local edge points at a desired coarse scale, which represents the distribution of ducts and stroma. FIG. 9 shows the image pattern histogram and the code value histogram obtained from the entire digital mammographic image. FIG. 9 illustrates that most of the code values of the region of interest fall between 1500 to 1800, while most of the code values of the entire image span the range of 1300 to 2600.

Figure 10:
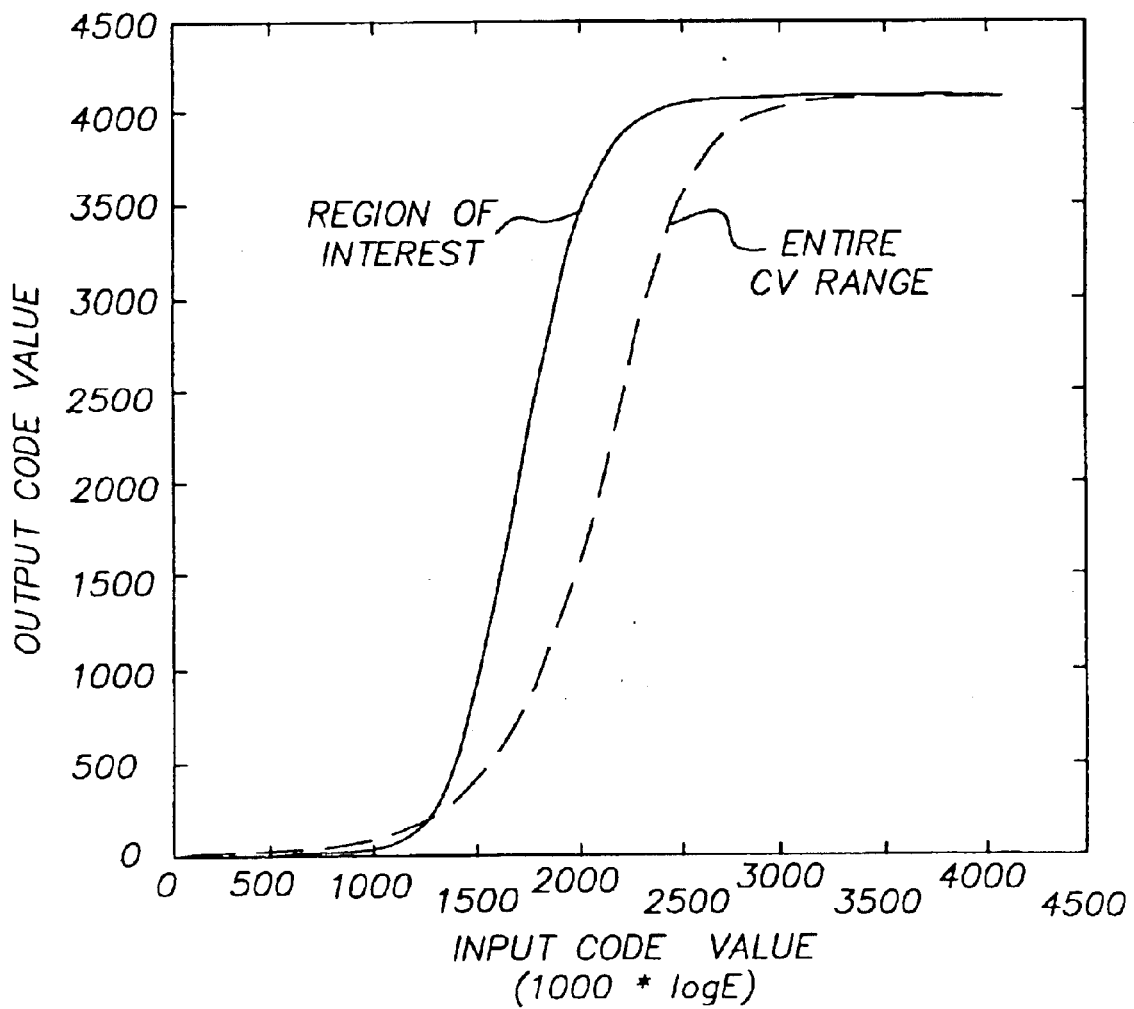
FIG. 10 is a graphical view showing an example of the tone scale curve constructed from a region of interested duct and stroma range (solid line) and from the entire effective code value range (dashed line).

From the image pattern histogram, four points (the far-left, the left, the right, and the far-right points) in the input mammographic image code value range are identified, which are essential input for the visually optimized tone scale algorithm. The code values between the left point and the right point correspond to the most important ductal and stroma structures that are examined in the mammographic image. The far-left and far-right points are used to roll off both ends (the toe and the shoulder) of the tone scale curve. This prevents the tone scale curve from producing a hard clipping in the displayed image. These four points are input to the visually optimized tone scale algorithm 100 to generate a tone scale curve. FIG. 10 shows an example of the tone scale curve constructed using the region of interest duct and stroma range as compared with using the entire effective code value (CV) range. $I_b$ is then tone scale mapped 102 to produce $I_t$.

(2) Contrast Weight Control Module

The function of contrast weight control is to preserve or amplify the edges that are important and suppress the edges that are not important. In a mammographic image, the large edges are almost always caused by X-ray attenuation differences in the skin region, which contains mostly the fat and skin and little of diagnostic value. This kind of edge needs to be suppressed. There are some edges that have very small gradient magnitudes, which mostly are caused by noise. This kind of edge needs to be suppressed also. There are edges that have moderate gradient magnitudes, which are located mostly in the middle portion of the mammographic image. They are mostly the edges of ducts and stroma. These edges need to be amplified. The function of the Contrast Weight Control module is to detect all the ductal and stroma edges in the input image and to generate a weight control signal for each pixel of the image. The small magnitude edges and very big magnitude edges are given a contrast small gain, while the moderate magnitude edges are given a higher gain. As a result of this gain control mechanism, the important edges are greatly amplified in the output while the big and small edges are suppressed.

Figure 11:
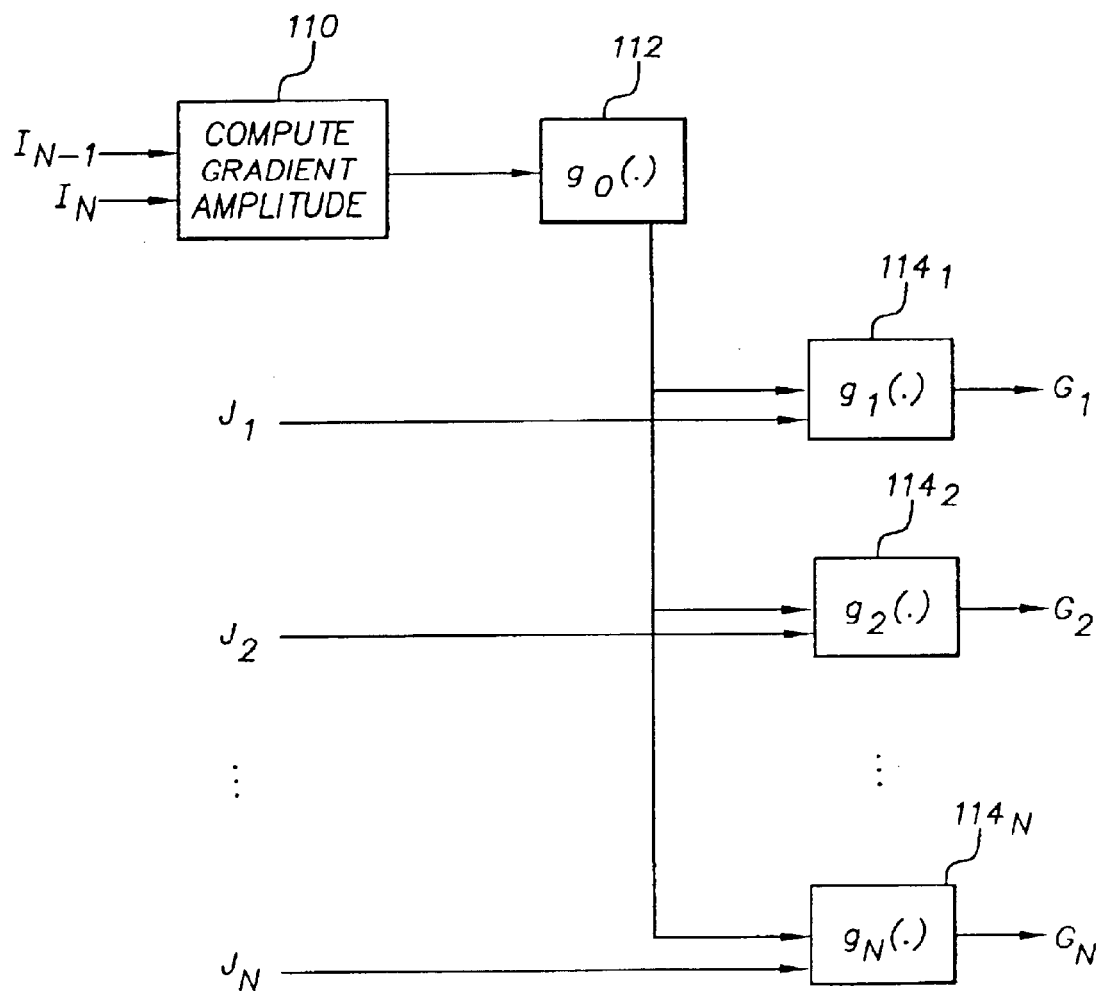
FIG. 11 is a block diagram showing the contrast weight control module.

As mentioned above, detecting the important edges at a coarse scale is reliable. That means that the contrast weight-control signal has to be computed from a coarse scale edge detection. FIG. 11 shows the preferred embodiment of the contrast-weight control signal generation. Two inputs, $I_{N-1}$ and $I_N$, are the output of filters $F_{N-1}$ and $F_N$ from the preprocessed input image $I_b$, respectively (see: FIGS. 7, 8). These two inputs represent the edge signals in the x and y directions at the coarsest scale. Then the gradient magnitude is computed by the gradient amplitude processor 110. The computed edge gradient magnitude is mapped through a function $g_0$ 112, and the output T is used to modify the gain-control signals $G_1, G_2, \ldots, G_N$. The general functional form of $g_0$ 112 is chosen so that when the edge gradient amplitude is very small or very large, its output value T is small and when the edge gradient amplitude is moderate, T is big. The T value is used as a mask image so that the functions $g_1, g_2, \ldots, g_N$ can adjust its gain spatially. When T is small, the gain control function, $g_i$, produces the local gain factor $G_i$ to suppress the edges, when T is big, the weight control function produces a larger gain to amplify the edges.

The N additional input signals to the Contrast Weight Control module are $J_1, J_2, \ldots, J_N$ from the output of decomposition filter $F_1, F_2, \ldots, F_N$. For the first embodiment in FIG. 7a, these N inputs are processed from the preprocessed input image $I_b$. For the second embodiment in FIG. 7b, these N inputs are processed from the tone-scaled version of the input image. These input signals are modified by functions $g_1, g_2, \ldots, g_N$ under the influence of T to produce the final weight control signals $G_1, G_2, \ldots, G_N$. The general form of the functions, $g_1, g_2, \ldots, g_N$, is similar to that of $g_0$. That is, $g_i$ produces small gain factors for edge pixels in $J_i$ when T is small and produces big gain factors when T is big. The function $g_i$ allows contrast weight control with between-scale interactions because it adjusts the pixels at scale i whose corresponding pixels are being detected in the coarsest scale. Any scheme that attempts to suppress the banding artifacts has to use a coarse scale edge detector to control the contrast weight factor. This is why a gain-control function generated internally within each scale cannot work well. The weight contrast signal for the fine resolution details has to come from the coarse resolution edges. That means for the very big and very small image details that are detected in the coarsest scale, the corresponding pixels at an other scale, say i, are adjusted by the local small gain factor $G_i$ to suppress the edges. In comparison, for the moderate image details that are detected in the coarsest scale, the corresponding pixels at scale i are adjusted by the local large gain factor $G_i$ to enlarge the edges.

The invention has been described in detail with particular reference to certain preferred embodiments thereof, but it will be understood that variations and modifications can be effected within the spirit and scope of the invention.

PARTS LIST 10 input image source
12 extract the breast region
14 decomposition filter bank
16 output mountain-view presentation
18 tone scale curve
20 decomposition filter bank
22 contrast weight control
24 reconstruction filter bank
30 determine orientation
32 determine candidate boundary
34 flip image if facing left
36 searching skin line from left
38 searching skin line from the right at curvature bottom
40 link and smooth the skin line
42 flip image back if facing left
44 determine coordinates of bounding box
46 extract the breast region
50 tone scale curve
52 filter $U_{N/2}$
$54_1$ filter $F_1$
$54_2$ filter $F_2$
$54_N$ filter $F_N$
$56_1$ $M_1$
$56_2$ $M_2$
$56_N$ $M_N$
58 contrast weight control generator
$60_1$ filter $H_1$
$60_2$ filter $H_2$
$60_N$ filter $H_N$
62 filter $V_{N/2} \ldots V_1$
64 $\Sigma$
70 filter $F_{N-1}$
72 filter $F_N$
74 tone scale curve
$76_1$ filter $F_1$
$76_2$ filter $F_2$
$76_N$ filter $F_N$
78 filter $U_{N/2}$
$80_1$ $M_1$
$80_2$ $M_2$
$80_N$ $M_N$
82 contrast weight control
$84_1$ filter $H_1$
$84_2$ filter $H_2$
$84_N$ filter $H_N$
86 filter $V_{N/2} \ldots V_1$
88 $\Sigma$
90 filter $F_{N-1}$
92 filter $F_N$
94 compute gradient amplitude
96 compute edge map
98 compute histogram from pixels belong to edge map
100 generate tone scale curve
102 tone scale mapping
110 compute gradient amplitude
112 $g_0(.)$
$114_1$ $g_1(.)$
$114_2$ $g_2(.)$
$114_N$ $g_N(.)$

What is claimed is:

1. A method of enhancing high contrast details of an input image for rendering it effectively on an output display medium comprising the steps of:

constructing a tone scale curve from the input image;
applying the tone scale curve to the input image to produce a tone-scaled image;
applying a decomposition filter bank to the tone-scaled image to produce the low-pass tone-scaled image;
applying the decomposition filter bank to the input image to produce the high-passed input image in each spatial scale;
generating the contrast weight control signals from the high-passed input image in each spatial scale;
adjusting the high-passed input image in each scale according to said contrast weight control signals; and
applying a reconstruction filter bank to the low-pass tone-scaled image and the adjusted high-pass input image to produce a contrast enhancement presentation image for rendering on an output display medium,
said step of generating the contrast weight control signals including the steps of:
applying a decomposition filter bank to the input image to produce a high-passed input image at a coarse scale;
computing a gradient amplitude of the high-passed input image at the coarse scale;
creating a mapping function wherein an output value T is large when the gradient amplitude at the coarse scale is moderate and the output value T is small when the gradient amplitude at the coarse scale is very small and very large; and
using the output value T as a mask image.

2. The method according to claim 1, wherein said constructing a tone scale curve includes:
applying a decomposition filter bank to the input image to produce a high-passed input image at a coarse scale;
computing a gradient amplitude of the high-passed input image at the coarse scale;
computing a binary edge map image where value 1 representing a pixel being the local maximum gradient magnitude along the gradient direction and value 0 represents other pixels;
computing an image pattern histogram from the pixels belong to the edge map with value 1 at the coarse scale;
finding a range that covers the most effective code values in the image pattern histogram; and
constructing the tone scale curve from the found range.

3. The method according to claim 1, wherein the step of using the output value T as a mask image is accomplished by:
creating a mask image of the weight factor G such that G produces large gain factors for pixels in each scale whose corresponding gradient amplitudes at the coarse scale have large T values and small gain factors for pixels in each scale whose corresponding gradient amplitudes at the coarse scale have small T values.

4. The method according to claim 1, wherein filters used in the decomposition filter bank are edge detectors at different spatial scales.

* * * * *